(12) United States Patent
Kim et al.

(10) Patent No.: US 11,541,637 B2
(45) Date of Patent: Jan. 3, 2023

(54) HOT DIP PLATED STEEL SHEET HAVING EXCELLENT CORROSION RESISTANCE AND WORKABILITY

(71) Applicant: POSCO, Pohang-si (KR)

(72) Inventors: Su-Young Kim, Pohang-si (KR); Moon-Jae Kwon, Pohang-si (KR)

(73) Assignee: POSCO Co., Ltd, Pohang-si (KR)

( * ) Notice: Subject to any disclaimer, the term of this patent is extended or adjusted under 35 U.S.C. 154(b) by 0 days.

(21) Appl. No.: 17/271,343

(22) PCT Filed: Dec. 10, 2018

(86) PCT No.: PCT/KR2018/015602
§ 371 (c)(1),
(2) Date: Feb. 25, 2021

(87) PCT Pub. No.: WO2020/045754
PCT Pub. Date: Mar. 5, 2020

(65) Prior Publication Data
US 2021/0178727 A1    Jun. 17, 2021

(30) Foreign Application Priority Data

Aug. 31, 2018  (KR) .......................... 10-2018-0103881

(51) Int. Cl.
*B32B 15/01* (2006.01)
*C22C 18/04* (2006.01)
(Continued)

(52) U.S. Cl.
CPC ............ *B32B 15/013* (2013.01); *B32B 15/01* (2013.01); *B32B 15/012* (2013.01); *B32B 15/04* (2013.01);
(Continued)

(58) Field of Classification Search
CPC ..... B32B 15/013; B32B 15/012; B32B 15/01; B32B 15/04; B32B 15/043; B32B 15/18;
(Continued)

(56) References Cited

U.S. PATENT DOCUMENTS

2013/0183541 A1   7/2013  Kim et al.
2013/0295411 A1   11/2013 Yoshida et al.
(Continued)

FOREIGN PATENT DOCUMENTS

| CN | 103282533 | 9/2013 |
| CN | 103361588 | 10/2013 |

(Continued)

OTHER PUBLICATIONS

Machine Translation, Hidekazu, JP 2002-275611 A, Sep. 2002. (Year: 2002).*

(Continued)

*Primary Examiner* — Michael E. La Villa
(74) *Attorney, Agent, or Firm* — Cantor Colburn LLP

(57) ABSTRACT

Provided is a plated steel sheet applicable for various purposes as in construction materials, household electric appliances, automobiles, etc. and, more particularly, to a hot dip plated steel sheet having excellent corrosion resistance and workability and a manufacturing method therefor.

3 Claims, 3 Drawing Sheets

(51) Int. Cl.

| | | |
|---|---|---|
| C22C 38/04 | (2006.01) | |
| C23C 2/06 | (2006.01) | |
| C23C 2/20 | (2006.01) | |
| C23C 2/28 | (2006.01) | |
| C23C 2/40 | (2006.01) | |
| C23C 30/00 | (2006.01) | |
| C23C 2/26 | (2006.01) | |
| B32B 15/04 | (2006.01) | |
| B32B 15/18 | (2006.01) | |
| B32B 15/20 | (2006.01) | |
| C22C 38/00 | (2006.01) | |
| C23C 2/12 | (2006.01) | |

(52) U.S. Cl.
CPC ............ *B32B 15/043* (2013.01); *B32B 15/18* (2013.01); *B32B 15/20* (2013.01); *C22C 18/04* (2013.01); *C22C 38/00* (2013.01); *C22C 38/04* (2013.01); *C23C 2/06* (2013.01); *C23C 2/12* (2013.01); *C23C 2/20* (2013.01); *C23C 2/26* (2013.01); *C23C 2/28* (2013.01); *C23C 2/285* (2013.01); *C23C 2/40* (2013.01); *C23C 30/00* (2013.01); *C23C 30/005* (2013.01); *C22C 38/004* (2013.01); *Y10T 428/12799* (2015.01); *Y10T 428/12951* (2015.01); *Y10T 428/12958* (2015.01); *Y10T 428/12972* (2015.01); *Y10T 428/12979* (2015.01); *Y10T 428/2495* (2015.01); *Y10T 428/24967* (2015.01); *Y10T 428/26* (2015.01); *Y10T 428/263* (2015.01); *Y10T 428/264* (2015.01); *Y10T 428/265* (2015.01)

(58) Field of Classification Search
CPC ......... B32B 15/20; C22C 18/04; C22C 38/04; C22C 38/004; C22C 38/00; C23C 2/06; C23C 2/20; C23C 2/26; C23C 2/28; C23C 2/40; C23C 2/12; C23C 2/285; C23C 30/00; C23C 30/005; Y10T 428/12799; Y10T 428/12951; Y10T 428/12958; Y10T 428/12972; Y10T 428/12979; Y10T 428/2495; Y10T 428/24967; Y10T 428/26; Y10T 428/263; Y10T 428/264; Y10T 428/265

See application file for complete search history.

(56) References Cited

U.S. PATENT DOCUMENTS

| | | |
|---|---|---|
| 2013/0337287 A1 | 12/2013 | Hirata et al. |
| 2015/0072166 A1 | 3/2015 | Nakano et al. |
| 2015/0159253 A1 | 6/2015 | Oh et al. |
| 2015/0225831 A1 | 8/2015 | Riener et al. |
| 2015/0368778 A1 | 12/2015 | Allely et al. |
| 2020/0002798 A1 | 1/2020 | Tokuda et al. |

FOREIGN PATENT DOCUMENTS

| | | |
|---|---|---|
| CN | 103507324 | 1/2014 |
| CN | 104245997 | 12/2014 |
| EP | 0905270 | 3/1999 |
| EP | 1621645 | 2/2006 |
| EP | 2857544 | 4/2015 |
| EP | 3282040 | 2/2018 |
| JP | 0860324 | 3/1996 |
| JP | H11140615 | 5/1999 |
| JP | 2000104154 | 4/2000 |
| JP | 2002275611 | 9/2002 |
| JP | 2002371345 | 12/2002 |
| JP | 2007284718 | 11/2007 |
| JP | 2012126994 | 7/2012 |
| JP | 2013014794 | 1/2013 |
| JP | 2013241665 | 12/2013 |
| KR | 2019960000868 | 2/1996 |
| KR | 19990082512 | 11/1999 |
| KR | 20050105778 | 11/2005 |
| KR | 20140002740 | 1/2014 |
| KR | 20140013334 | 2/2014 |
| KR | 101376381 | 3/2014 |
| WO | 2011001662 | 1/2011 |
| WO | 2018139620 | 8/2018 |

OTHER PUBLICATIONS

International Search Report—PCT/KR2018/015602 dated May 27, 2019.
European Search Report—European Application No. 18931872.8 dated Sep. 15, 2021, citing EP 2857544, WO 2011/001662, Nowacki, et al., EP 3282040, and Kania, et al.
Kania, et al., Corrosion resistance of coatings obtained in a Zn+23Al bath with Mg additions, Ochrona Przed Korozja, 2013, vol. 56, No. 10, pp. 441-448.
Nowacki, et al., The Properties of ZnAlMg Alloys for Batch Hot Dip Metallization, Solid State Phenomena, 2016, vol. 246, pp. 143-148.
Japanese Office Action—Japanese Application No. 2021-510207 dated Apr. 12, 2022, citing JP 2002-275611, KR 10-1376381, JP 2013-241665, JP 2013-014794, US 2015/0225831, WO 2011/001662, and WO 2018/139620.
Chinese Office Action—Chinese Application No. 201880097006.1 dated Aug. 16, 2022, citing CN 104245997, WO 2011/001662, JP 2002-275611, US 2015/0159253, JP 2007-284718, CN 103282533, JP H08-60324, and JP 2002-371345.
Japanese Notice of Preissuance Submission—Japanese Application No. 2021-510207 submitted on Jul. 25, 2022.
Yao, et al., Effects of Mg content on microstructure and electrochemical properties of Zn—Al—Mg alloys, Journal of Alloys and Compounds, 2015, vol. 645, pp. 131-136.
Japanese Office Action—Japanese Application No. 2021-510207 dated Nov. 15, 2022, citing WO 2018/139620, JP 2012-126994, JP 2002-275611, KR 10-1376381, JP 2013-241665, JP 2013-014794, US 2015/0225831, and WO 2011/001662.

* cited by examiner

HOT DIP PLATED STEEL SHEET HAVING EXCELLENT CORROSION RESISTANCE AND WORKABILITY

TECHNICAL FIELD

The present invention relates to a plated steel sheet applicable for various purposes in construction materials, household electric appliances, automobiles, etc, and, more particularly, to a hot-dip galvanized steel sheet having excellent corrosion resistance and workability and a manufacturing method thereof.

BACKGROUND ART

A process of plating a steel sheet in a continuous hot-dip galvanizing process can not only lower manufacturing costs compared to processes such as electroplating, dry plating, and the like, but also can ensure excellent quality, such that a scope of use thereof as a material for construction, ships, home appliances, automobile interior and exterior panels, and the like is expanding.

Meanwhile, in recent years, due to a rapid increase in the price of raw materials containing zinc, to replace an existing zinc plated steel sheet, a development of a new plating system having a small amount of plating but excellent corrosion resistance is actively progressing.

In this regard, an alloy plated steel sheet having excellent corrosion resistance even with a small amount of adhesion by adding aluminum and magnesium to the existing zinc-based plating has been emerging.

A zinc-aluminum-magnesium-based plating bath has lower wettability with steel sheets and wider solidification zones than a zinc-based plating, such that a technology for controlling cooling after plating is important.

Conventionally, when aluminum and magnesium structure that are susceptible to oxidation develop on a surface of the steel sheet, a zinc-aluminum-magnesium-based alloy-plated steel sheet (Patent Documents 1 and 2), developed mainly in Japan is subjected to discoloration due to non-uniform oxidation, such that the surface darkens over time, significantly reducing the surface quality. In order to improve this problem, there is a method of adding a high-quality alloy element to a plating bath, but there are disadvantages that cause problems such as an increase in costs and an increase in side reaction products of the plating bath.

A zinc-aluminum-magnesium alloy plated steel sheet (Patent Document 3), which is recently developed mainly in Europe, is set as a final target for application to automobiles, and there is a problem that a total amount of aluminum and magnesium added is less than that of a zinc-aluminum-magnesium alloy plated steel sheet developed in Japan, so that sufficient corrosion resistance may not be secured.
(Patent Document 1) Japanese Laid-Open Publication No. 1999-140615
(Patent Document 2) Japanese Laid-Open Publication No. 2000-104154
(Patent Document 3) European Patent Publication 1621645 A1

DISCLOSURE

Technical Problem

An aspect of the present disclosure is to provide a hot-dip galvanized steel sheet having a good surface appearance and excellent workability, as well as having high corrosion resistance, by optimizing the composition of an alloy plating system, and by optimizing a cooling process of the plated steel material, and a manufacturing method thereof.

The subject of the present invention is not limited to the above. Additional problems of the present invention are described in the overall contents of the specification, and those of ordinary skill in the art to which the present invention pertains will not have any difficulty in understanding the additional problems of the present invention from the contents described in the specification of the present invention.

Technical Solution

According to an aspect of the present disclosure, a hot-dip galvanized steel sheet, having excellent corrosion resistance and workability, includes: a base steel sheet; and a Zn—Al—Mg-based alloy plating layer on at least one surface of the base steel sheet, wherein the Zn—Al—Mg-based alloy plating layer includes, by wt %, 20 to 30% of aluminum (Al), 3 to 5% of magnesium (Mg), and a balance of Zn and other inevitable impurities, wherein a surface structure of the Zn—Al—Mg-based alloy plating layer is comprised of a Zn phase, a Zn—Al phase, a $MgZn_2$ phase, and a Zn—Al—$MgZn_2$ phase, and an internal structure includes an Fe—Al alloy phase.

According to another aspect of the present disclosure, a manufacturing method of a hot-dip galvanized steel sheet having excellent corrosion resistance and workability, includes operations of: preparing an alloy plating bath including, by weight %, 20 to 30% of aluminum (Al), 3 to 5% of magnesium (Mg), a balance of Zn and other inevitable impurities; immersing a base steel sheet in the alloy plating bath, and preparing a plated steel sheet by performing plating; and cooling the plated steel sheet at a cooling rate of 8 to 30° C./s, wherein the plating is performed by adjusting a plating bath immersing temperature to 500 to 550° C. and a plating bath temperature to 480 to 550° C. to pass through the plating bath.

Advantageous Effects

According to an embodiment in the present disclosure, corrosion resistance may be improved by improving adhesion of the alloy plating layer by forming a fine and uniform cross-sectional structure of the alloy plating layer, and an alloy plated steel sheet having good surface qualities and excellent workability may be provided.

BEST MODE FOR INVENTION

Figure 1:
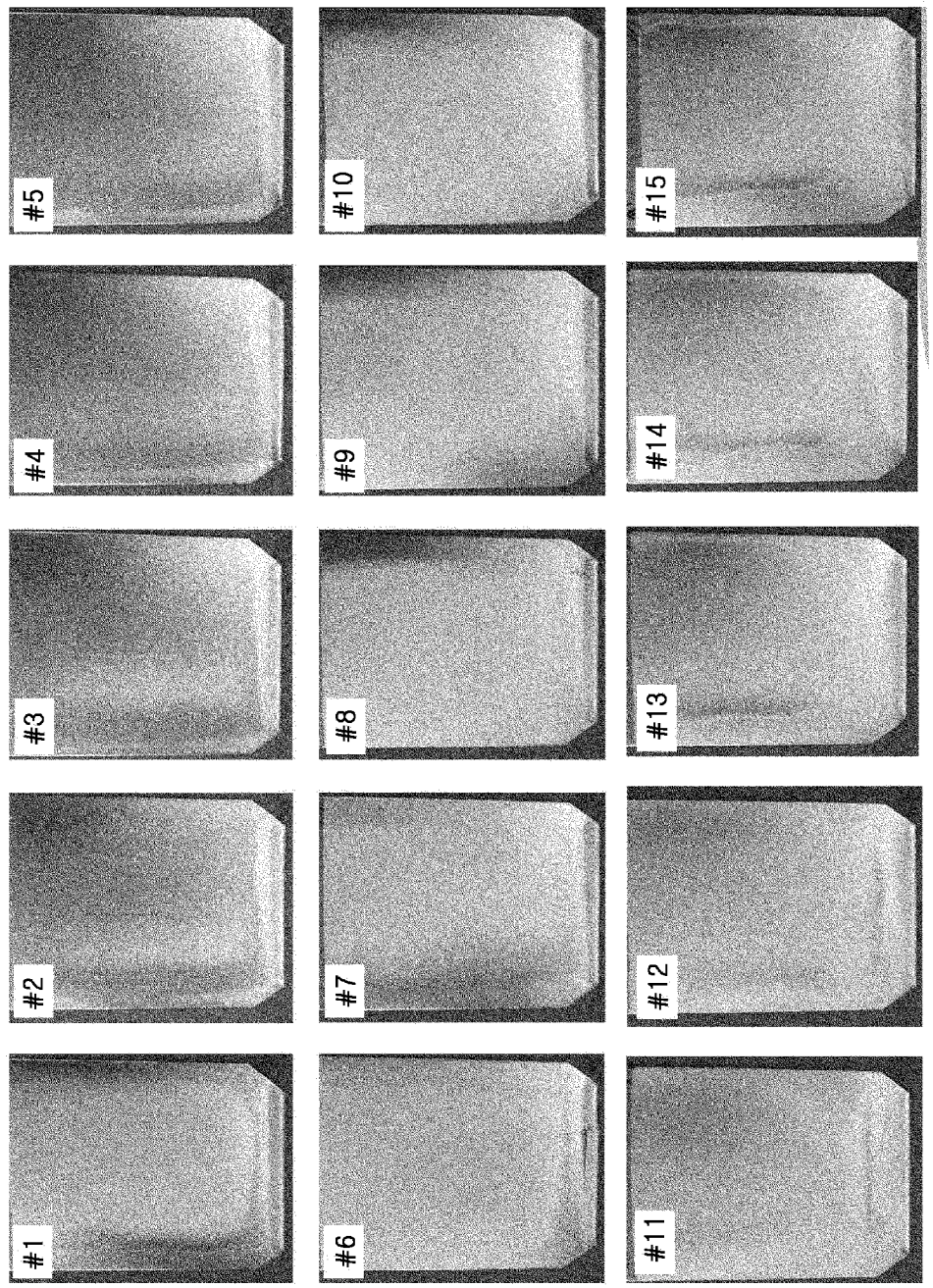
FIG. 1 is a photograph illustrating an appearance of a plated steel sheet according to an embodiment of the present disclosure.

In order to obtain a Zn—Al—Mg-based alloy plated steel sheet, when a Zn—Al—Mg alloy is plated, an initiation of solidification of the alloy plating layer is determined by the content of aluminum and magnesium, and at the end of solidification, as an eutectic phase finally containing Zn—Al—Mg is solidified, a solidification reaction of the plating layer is terminated. However, until the solidification of a Zn—Al—Mg ternary eutectic structure is terminated, flow patterning surface defects due to the strong oxidation of Mg are likely to occur, so there are restrictions on the use of Mg.

Nevertheless, in order to improve the corrosion resistance of Zn—Al—Mg alloy plated steel sheet, it is necessary to add Mg in a certain content or more, and as the content of Mg increases, a problem in which flow pattern defects due to oxidation increase may be confirmed. The present inventors have studied in depth a method to ensure good surface quality while securing corrosion resistance by a certain amount of Mg.

Specifically, in the case of Zn—Al—Mg-based alloy plating, it was confirmed that an erosion property was strong in the plating bath and the solidification zone was wide, and a structure of the alloy plating layer may be controlled by optimizing a cooling process as well as the alloy composition of the Zn—Al—Mg alloy plating system.

As a result, it was confirmed that it was possible to provide a Zn—Al—Mg-based alloy plated steel sheet having excellent workability with good surface qualities as well as excellent corrosion resistance, thereby resulting in completion of the present disclosure.

Hereinafter, the present disclosure will be described in detail.

According to an aspect of the present disclosure, a hot-dip galvanized steel sheet may include: a base steel sheet; and a Zn—Al—Mg-based alloy plating layer on at least one surface of the base steel sheet, wherein the Zn—Al—Mg-based alloy plating layer may include, by wt %, 20 to 30% of aluminum (Al), 3 to 5% of magnesium (Mg), a balance of Zn and other inevitable impurities.

The Zn—Al—Mg-based alloy plating layer may be formed from an alloy plating bath containing Al, Mg, and Zn having the alloy composition as described above.

Specifically, Al in the alloy plating bath is a major element in securing high corrosion resistance of the hot-dip galvanized steel sheet, and if the content thereof is less than 20%, it is difficult to secure sufficient corrosion resistance of the Zn—Al—Mg-based alloy plating layer. On the other hand, if the content thereof exceeds 30%, dross generation in the plating bath increases, resulting in poor surface quality of a final product.

Mg in the alloy plating bath is an element added to improve the corrosion resistance of the alloy plating layer and a cutting surface of the plating layer, and if the content thereof is less than 3%, the effect of improving corrosion resistance is insignificant, whereas if the content thereof exceeds 5%, there may be a problem that dross generation due to oxidation of the plating bath greatly increases.

Both Al and Mg are elements improving the corrosion resistance of the plating layer, and as a sum of these elements increases, the corrosion resistance may be further improved, and thus the sum of the contents of Al and Mg may be limited to 25% or more in the present disclosure.

Meanwhile, the composition in the alloy plating bath is substantially the same as the composition in the alloy plating layer.

The Zn—Al—Mg-based alloy plating layer having the above-described alloy composition may have a fine and uniform structure, and specifically, it is preferable that a surface layer structure of the Zn—Al—Mg-based alloy plating layer is comprised of a Zn phase, a Zn—Al phase, a $MgZn_2$ phase, and a Zn—Al—$MgZn_2$ phase, and an internal structure includes an Fe—Al alloy phase.

In the present disclosure, as a plating structure of the Zn—Al—Mg-based alloy plating layer, a fine Zn—Al phase, a $MgZn_2$ phase, and a Zn—Al—$MgZn_2$ phase may be formed on the surface (surface layer) of the alloy plating layer, thereby improving corrosion resistance.

In addition, in the present disclosure, an Fe—Al intermetallic compound (Fe—Al alloy phase) formed at an interface of the existing Zn—Al—Mg-based alloy plated steel sheet (interface between the base steel sheet and the plating layer) may be uniformly generated inside the alloy plating layer (internal structure), such that there is an effect of ensuring a surface appearance satisfactory.

Meanwhile, the Zn—Al—Mg-based alloy plating layer may have a thickness of 3 to 40 μm, and a surface structure within the Zn—Al—Mg-based alloy plating layer may correspond to a region from the surface of the alloy plating layer to ⅓t to ½t in a thickness direction (where t is the thickness (μm) of the alloy plating layer). The remainder, except for the surface structure corresponding to the above-described area may be referred to as an internal structure.

In the hot-dip galvanized steel sheet of the present disclosure, the surface structure and the internal structure of the Zn—Al—Mg-based alloy plating layer may be formed differently, and in this case, as the surface structure is formed as described above, the hot dip galvanized steel sheet has advantages of having superior corrosion resistance, and having an attractive surface appearance, as compared to the existing hot-dip galvanized steel sheet.

Hereinafter, a method of manufacturing a hot-dip galvanized steel sheet having excellent corrosion resistance and workability, another aspect of the present disclosure, will be described in detail.

A method of manufacturing a hot-dip galvanized steel sheet having excellent corrosion resistance and workability may include operations of: preparing an alloy plating bath having the above-described alloy composition; immersing a base steel sheet in the alloy plating bath, and preparing a plated steel sheet by performing plating; and cooling the plated steel sheet.

In performing plating by immersing the base steel sheet in an alloy plating bath satisfying the alloy composition proposed in the present disclosure, it is preferable to adjust a plating bath immersing temperature to 500 to 550° C., and a plating bath temperature to 480 to 550° C. to pass through a plating bath.

If the immersing temperature of the plating bath is less than 500° C., non-plated portions may occur on the surface of the formed alloy plating layer or adhesion of the plating layer is deteriorated, whereas if it exceeds 550° C., there is a problem that the adhesion of the plating layer is deteriorated.

It is preferable to cool the plated steel sheet obtained by plating according to the above, and the cooling is preferably performed to 300° C. or lower at a cooling rate of 8 to 30° C./s.

When the cooling rate is less than 8° C./s, the plating layer cannot be uniformly solidified. On the other hand, when the cooling rate exceeds 30° C./s, there is a problem that flow streak defects may occur on the surface of the plating layer.

In addition, the cooling may be performed in a gas atmosphere comprised of 4 vol % or less (including 0%) of hydrogen ($H_2$) and residual nitrogen ($N_2$), and may be performed using, for example, an air get cooler.

By controlling the cooling process as described above, an primary Zn phase and a Zn—Al phase are first may be generated on a surface of the alloy plating layer, and a fine Zn—Al phase, and $MgZn_2$ phase and Zn—Al—$MgZn_2$ phase can be formed in a region below the surface (meaning a region between the surface and an internal alloy layer (internal structure)).

Finally, by generating a uniform structure on a surface layer of the alloy plating layer, the corrosion resistance of a plane portion may be greatly improved, and in particular, it is possible to obtain an effect of improving sacrificial corrosion resistance of a cross-sectional portion by the Zn phase and the $MgZn_2$ phase.

Prior to cooling the plated steel sheet, an operation of gas wiping treatment may further be included, and an amount of plating adhesion may be adjusted from the gas wiping treatment.

As the gas used in the gas wiping treatment, air or nitrogen may be used, of which nitrogen is more preferably used. This is because, when air is used, Mg oxidation preferentially occurs on the surface of the plating layer, thereby causing surface defects of the plating layer.

Meanwhile, the base steel sheet may be a cold-rolled material such as general carbon steel (including low carbon steel), stainless steel, and the like, and is not particularly limited thereto.

The cold-rolled material may be subjected to a degreasing process for cleaning rolling oil on the surface of the rolled steel sheet, and then an annealing heat treatment to recover a rolled structure and secure a material.

The annealing heat treatment may be performed in a temperature range of 700 to 850° C., but generally, an annealing heat treatment may be performed in a temperature range of 700 to 800° C. for low carbon steel, and an annealing heat treatment may be performed in a temperature range of 800 to 850° C. for ultra-low carbon steel or high strength steel.

The cold-rolled material may have a thickness of 0.3 to 1 mm, but is not limited thereto.

Hereinafter, the present disclosure will be described in more detail through examples. However, it is necessary to note that the following examples are only intended to illustrate the present disclosure in more detail and are not intended to limit the scope of the present disclosure. This is because the scope of the present disclosure is determined by matters described in the claims and able to be reasonably inferred therefrom.

MODE FOR INVENTION

Embodiment 1

A cold-rolled low-carbon steel (0.003% C-0.15% Mn-a balance of Fe and other unavoidable impurities) specimen (a thickness of 0.7 mm) was degreased and then subjected to an annealing heat treatment at 780° C. During the annealing heat treatment, a gas atmosphere in a furnace was controlled to 4 to 20% of the $H_2$-balance of $N_2$ as a reducing gas atmosphere, and a dew point temperature was −40° C. or lower.

Thereafter, alloy melting plating was performed on the specimen under the conditions shown in Table 1 below. In this case, an alloy plating bath (0.027% of Fe) having a composition of 22.77% of Al, 3.6% of Mg, and a balance of Zn by weight % was used.

TABLE 1

| Specimens | Immersing temperature (° C.) | Immersing time (sec.) | Plating bath temperature (° C.) | Gas for cooling (l/min) | Cooling rate (° C./s) | Thickness of alloy plating layer (μm) | Classifications |
|---|---|---|---|---|---|---|---|
| 1 | 520 | 5 | 510 | 200/200 | 4.4 | 4.4 | CE 1 |
| 2 | 520 | 5 | 510 | 400/400 | 6.2 | 6.0 | CE 2 |
| 3 | 520 | 5 | 510 | 600/600 | 6.9 | 5.9 | CE 3 |
| 4 | 520 | 5 | 510 | 700/700 | 8.1 | 6.0 | IE 1 |
| 5 | 520 | 5 | 510 | 700/700 | 8.3 | 5.9 | IE 2 |
| 6 | 540 | 5 | 530 | 200/200 | 4.3 | 4.5 | CE 4 |
| 7 | 540 | 5 | 530 | 400/400 | 6.0 | 6.6 | CE 5 |
| 8 | 540 | 5 | 530 | 600/600 | 6.8 | 5.2 | CE 6 |
| 9 | 540 | 5 | 530 | 700/700 | 8.2 | 5.0 | CE 7 |
| 10 | 540 | 5 | 530 | 700/700 | 8.1 | 6.6 | CE 8 |
| 11 | 560 | 5 | 550 | 200/200 | 4.5 | 5.7 | CE 9 |
| 12 | 560 | 5 | 550 | 400/400 | 6.1 | 5.5 | CE 10 |
| 13 | 560 | 5 | 550 | 600/600 | 6.8 | 5.7 | CE 11 |
| 14 | 560 | 5 | 550 | 700/700 | 8.0 | 5.4 | CE 12 |
| 15 | 560 | 5 | 550 | 700/700 | 8.2 | 5.7 | CE 13 |

*IE: Inventive example/CE: Comparative example

Figure 2:
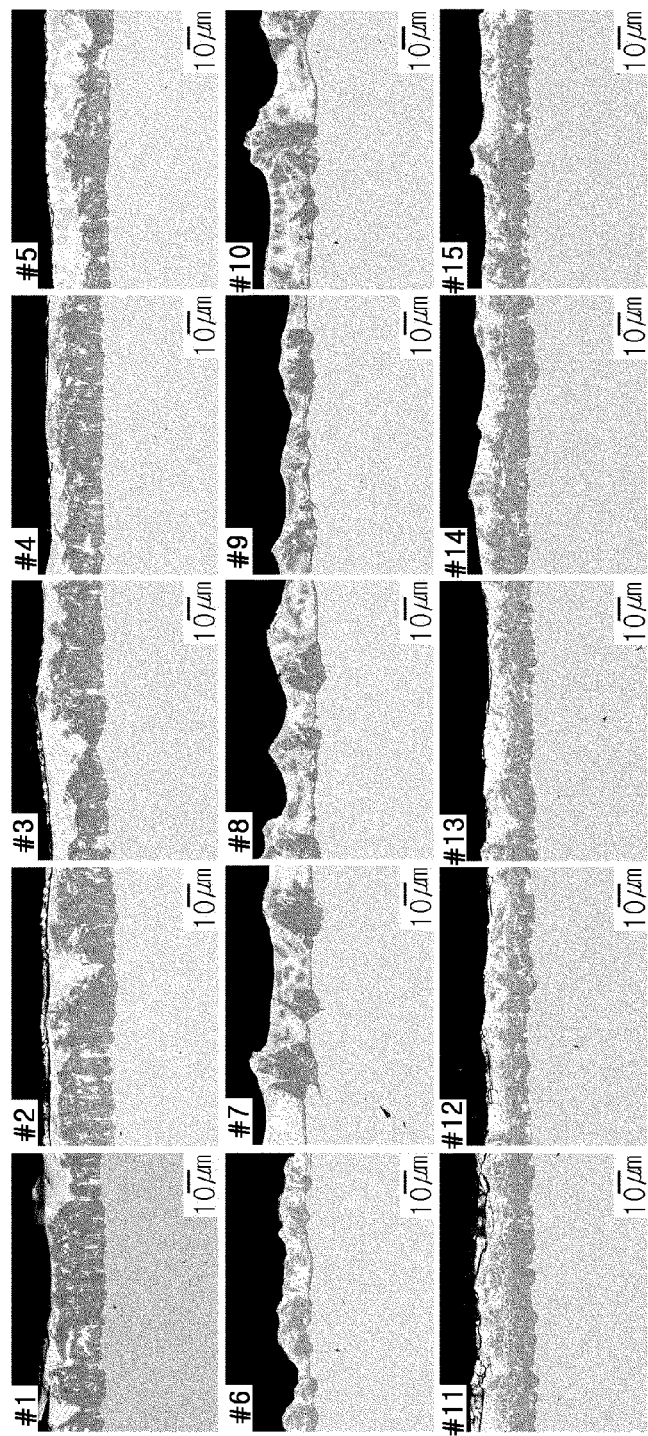
FIG. 2 is a photograph of a cross-section of an alloy plating layer of the plated steel sheets of FIG. 1 observed by SEM.

As described above, results of observing a plating appearance for each plated steel sheet on which plating has been completed were shown in FIG. 1, and an image of a cross-section of an alloy plating layer observed by SEM is shown in FIG. 2.

As shown in FIG. 2, it can be confirmed that a surface layer structure and an internal structure are separated and formed uniformly only in specimens 4 and 5 corresponding to Inventive Examples 1 and 2. In particular, it can be seen that an alloy phase is uniformly formed inside the plating layer.

On the other hand, it can be seen that specimens of Comparative Examples 1 to 13 are formed by mixing an Fe—Al alloy phase with a Zn phase and a Zn—Al phase.

Figure 3:
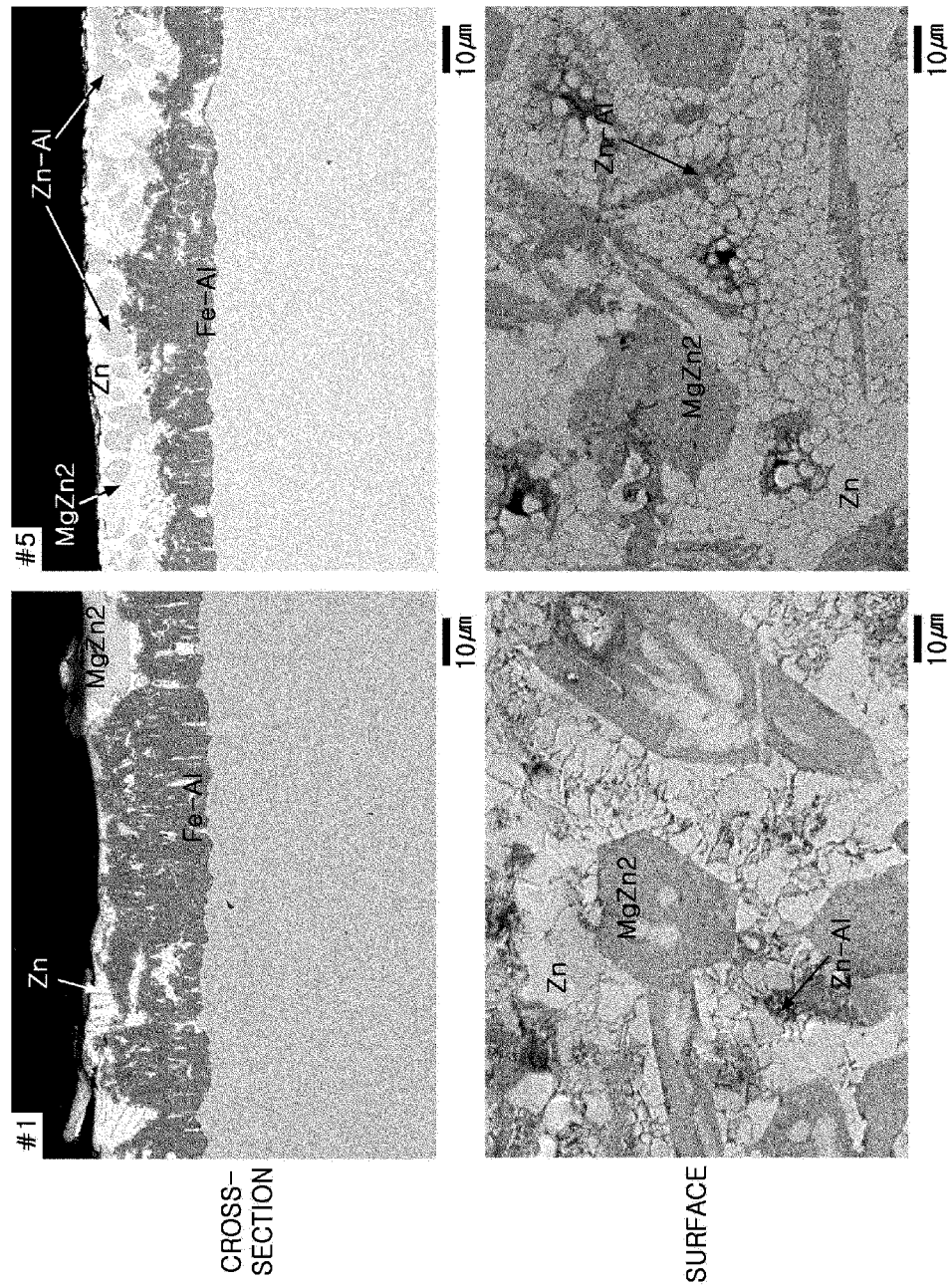
FIG. 3 is a photograph of a structure in the alloy plating layer of Comparative Example 1 (left) and Inventive Example 2 (right) according to an embodiment of the present disclosure observed by SEM.

In addition, FIG. 3 is a photograph of the structure of the alloy plating layer of Comparative Example 1 and Inventive Example 2 observed by SEM.

As shown in FIG. 3, it can be seen that, in the case of Comparative Example 1, an alloy plating layer having the plating structure intended in the present disclosure is not uniformly formed on a surface of the plated steel sheet, whereas in Inventive Example 2, an Fe—Al alloy layer is formed inside the alloy plating layer, and a plating structure is formed uniformly above the alloy layer.

Embodiment 2

The same specimen as in Example 1, that is, a cold-rolled carbon steel specimen (thickness of 0.7 mm) was degreased and then subjected to an annealing heat treatment at 750° C. During the annealing heat treatment, the gas atmosphere in the furnace was controlled to 4 to 20% of $H_2$-balance of $N_2$ as a reducing gas atmosphere, and a dew point temperature was −40° C. or lower.

Thereafter, alloy hot-dip galvanizing was performed on the specimen under each condition shown in Table 2 below.

TABLE 2

| Specimens | Composition of plating bath (balance of Zn, %) | | Immersing temperature (° C.) | Immersing time (Sec.) | Plating bath temperature (° C.) | Gas for cooling (l/min) | Cooling rate (° C./s) | Classifications |
|---|---|---|---|---|---|---|---|---|
| | Al | Mg | | | | | | |
| 1 | 23 | 3.6 | 520 | 5 | 510 | 200/200 | 4.4 | CE A |
| 2 | 23 | 3.6 | 520 | 5 | 510 | 700/700 | 8.3 | IE A |

*CE: Comparative example/*IE: Inventive example

In order to evaluate corrosion resistance of a plated steel sheet, in which plating has been completed according to each condition, after performing a corrosion promotion test with a salt spray test (salt spray standard test in accordance with KS-C-0223), an elapsed time was measured until a red rust generation area on a surface of the plating layer became 5%.

In addition, in order to evaluate plating adhesion, a 180-degree bending test was performed, and then a bending surface was visually observed to confirm occurrence of cracks.

Each result was shown in Table 3 below. As shown in Table 3 below, it can be seen that Inventive Example A has superior corrosion resistance, compared to Comparative Example A, and no non-plated portion phenomenon is observed. In particular, bending adhesion of Inventive Example A was at the same level as that of a hot-dip galvanized material.

TABLE 3

| Classifications | Salt spray test | Crack occurrence of bending surface |
|---|---|---|
| Comparative Example A | Red rust generation after 7 to 8 weeks | x |
| Inventive Example A | Red rust generation after 11 to 12 weeks | x |

The invention claimed is:

1. A hot-dip galvanized steel sheet having excellent corrosion resistance and workability, comprising:
   a base steel sheet; and
   a Zn—Al—Mg-based alloy plating layer formed on at least one surface of the base steel sheet,
   wherein the Zn—Al—Mg-based alloy plating layer comprises, by wt %, 20 to 30% of aluminum (Al), 3 to 5% of magnesium (Mg), and a balance of Zn and other inevitable impurities, and
   wherein the Zn—Al—Mg-based alloy plating layer comprises: a surface layer structure comprised of a Zn phase, a Zn—Al phase, a $MgZn_2$ phase, and a Zn—Al—$MgZn_2$ phase; and an internal structure formed between the surface layer structure and the base steel sheet, the internal structure comprising: an Fe—Al alloy phase, and
   wherein the surface layer structure of the Zn—Al—Mg-based alloy plating layer is a region from a surface of the Zn—Al—Mg-based alloy plating layer to ⅓t to ½t in a thickness direction where t is a thickness of the Zn—Al—Mg-based alloy plating layer.

2. The hot-dip galvanized steel sheet having excellent corrosion resistance and workability of claim 1, wherein, in the Zn—Al—Mg-based alloy plating layer, a sum of the aluminum (Al) and the magnesium (Mg) comprises 25% or more by wt %.

3. The hot-dip galvanized steel sheet having excellent corrosion resistance and workability of claim 1, wherein the Zn—Al—Mg-based alloy plating layer has a thickness of 3 to 40 μm.

* * * * *